United States Patent
Serizawa et al.

(10) Patent No.: US 8,001,061 B2
(45) Date of Patent: Aug. 16, 2011

(54) FIRST AND SECOND UNSUPERVISED LEARNING PROCESSES COMBINED USING A SUPERVISED LEARNING APPARATUS

(75) Inventors: Shinichiro Serizawa, Kanagawa (JP); Tomoyuki Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 711 days.

(21) Appl. No.: 11/819,287

(22) Filed: Jun. 26, 2007

(65) Prior Publication Data

US 2008/0147576 A1 Jun. 19, 2008

(30) Foreign Application Priority Data

Dec. 19, 2006 (JP) ................. P2006-341144

(51) Int. Cl.
*G06F 15/18* (2006.01)
*G06F 17/20* (2006.01)
(52) U.S. Cl. ............. 706/12; 382/161; 600/509
(58) Field of Classification Search .......... 700/12; 600/509; 382/161
See application file for complete search history.

(56) References Cited

U.S. PATENT DOCUMENTS

| | | | |
|---|---|---|---|
| 6,292,577 B1 | 9/2001 | Takahashi | |
| 2003/0002731 A1* | 1/2003 | Wersing et al. | 382/161 |
| 2007/0009152 A1 | 1/2007 | Kanda | |
| 2007/0167846 A1* | 7/2007 | Sternickel et al. | 600/509 |

FOREIGN PATENT DOCUMENTS

| | | |
|---|---|---|
| JP | HEI.6-348676 A | 12/1994 |
| JP | HEI.8-329032 A | 12/1996 |
| JP | HEI.10-326286 | 12/1998 |
| JP | 2005-293264 A | 10/2005 |

OTHER PUBLICATIONS

Zhong, Q., "Research on the Combination of ANN with Hybrid Learning Pattern", Microcomputer Development, 2001, pp. 58-61.

* cited by examiner

*Primary Examiner* — Jeffrey A Gaffin
*Assistant Examiner* — Kalpana Bharadwaj
(74) *Attorney, Agent, or Firm* — Morgan, Lewis & Bockius LLP

(57) ABSTRACT

A data processing apparatus includes first and second unsupervised learning process units and a supervised learning process unit. The first unsupervised learning process unit classifies data of a first data group according to unsupervised learning, to perform dimension reduction for the first data group and to obtain first classified data. The second unsupervised learning process unit classifies data of a second data group according to the unsupervised learning, to perform dimension reduction for the second data group and to obtain a second classified data group. The supervised learning process unit performs supervised learning using, as a teacher, the first classified data group obtained by the first unsupervised learning process unit and the second classified data group obtained by the second unsupervised learning process unit to determine a mapping relation between the first classified data group and the second classified data group.

8 Claims, 7 Drawing Sheets

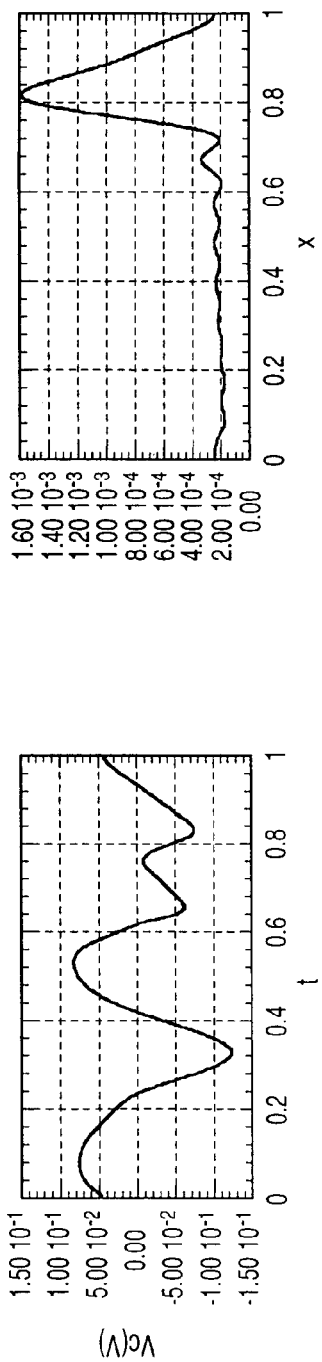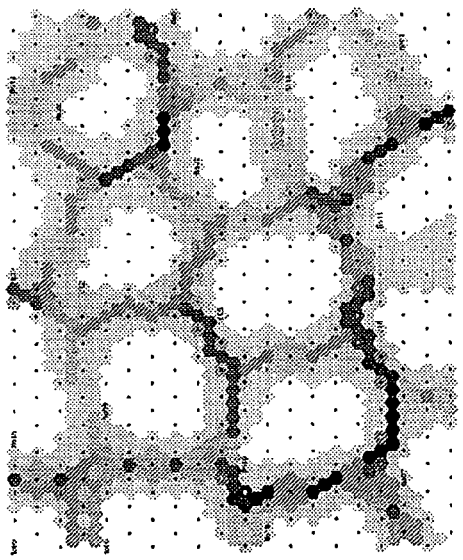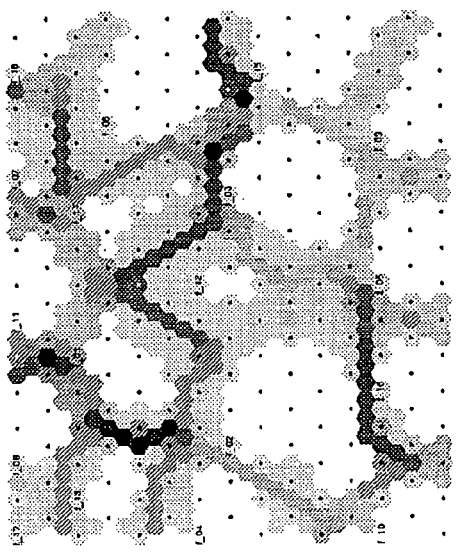

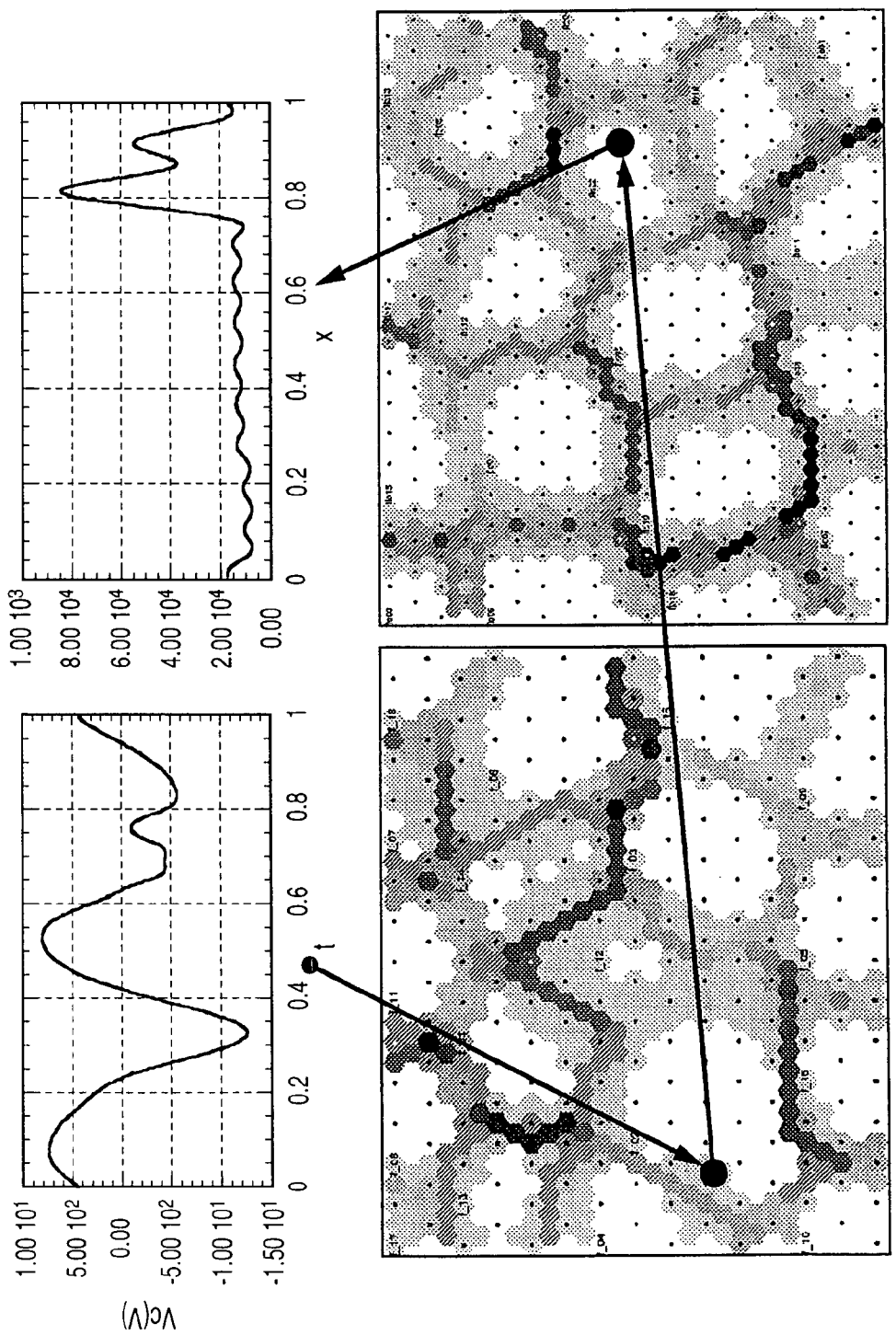

FIRST AND SECOND UNSUPERVISED LEARNING PROCESSES COMBINED USING A SUPERVISED LEARNING APPARATUS

CROSS-REFERENCE TO RELATED APPLICATIONS

This application is based on and claims priority under 35 U.S.C. §119 from Japanese Patent Application No. 2006-341144 Dec. 19, 2006.

BACKGROUND

Technical Field

The invention relates to a data processing apparatus, a data processing method, a data processing program and a computer readable medium.

SUMMARY

According to an aspect of the invention, a data processing apparatus includes a first unsupervised learning process unit, a second unsupervised learning process unit and a supervised learning process unit. The first unsupervised learning process unit classifies data of a first data group according to unsupervised learning, to perform dimension reduction for the first data group and to obtain first classified data. The second unsupervised learning process unit classifies data of a second data group according to the unsupervised learning, to perform dimension reduction for the second data group and to obtain a second classified data group. The supervised learning process unit performs supervised learning using, as a teacher, the first classified data group obtained by the first unsupervised learning process unit and the second classified data group obtained by the second unsupervised learning process unit to determine a mapping relation between the first classified data group and the second classified data group.

BRIEF DESCRIPTION OF THE DRAWINGS

Exemplary embodiments of the invention will be described in detail below with reference to the accompanying drawings, wherein:

FIG. 3 is a schematic representation to show specific examples of data groups processed by the data processing apparatus according to the exemplary embodiment of the invention;

DETAILED DESCRIPTION

A data processing apparatus, a data processing method, a data processing program and a computer readable medium storing the data processing program according to exemplary embodiments of the invention will be described with reference to the accompanying drawings.

Figure 1:
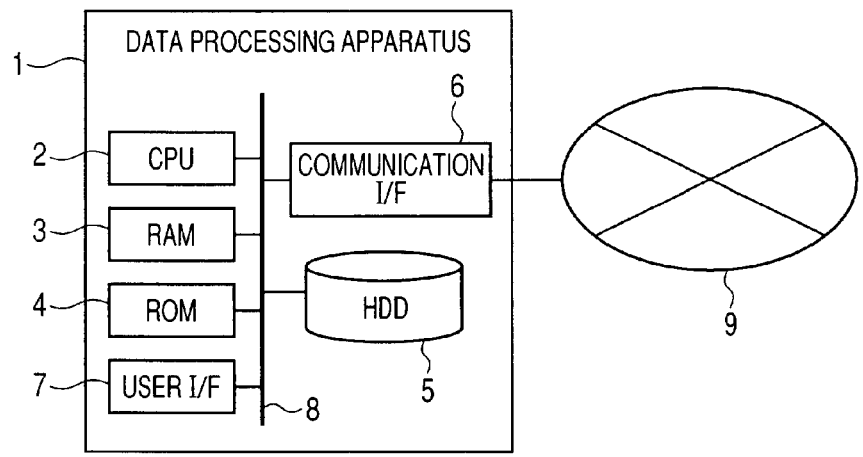
FIG. 1 is a block diagram to show a hardware configuration example of a data processing apparatus according to an exemplary embodiment of the invention.

First, the hardware configuration of the data processing apparatus will be described. FIG. 1 is a block diagram to show a hardware configuration example of the data processing apparatus.

The data processing apparatus described here as an example has a computer function. Specifically, a personal computer, a simulator specialized for simulation execution, etc., may be used.

The computer function is implemented as the hardware configuration shown in FIG. 1. That is, a data processing apparatus 1 includes a CPU (central processing unit) 2, RAM (random access memory) 3, ROM (Read-Only Memory) 4, an HDD (Hard Disk Drive or similar storage) 5, a communication interface (I/F) 6, a user I/F 7, and an internal bus 8 for connecting them. A communication line 9 is connected to the communication I/F 6. As the communication line 9, a network to construct a wide-area network such as the Internet can be named, but the communication line 9 may be a network to construct a local area network (LAN) or a public switched telephone network to conduct facsimile communications. The user I/F 7 may be implemented as an information display, an operation switch, etc., but may be an interface for connecting to a display such as a CRT (Cathode Ray Tube) or a liquid crystal panel and an operation unit such as a keyboard or a mouse.

Figure 2:
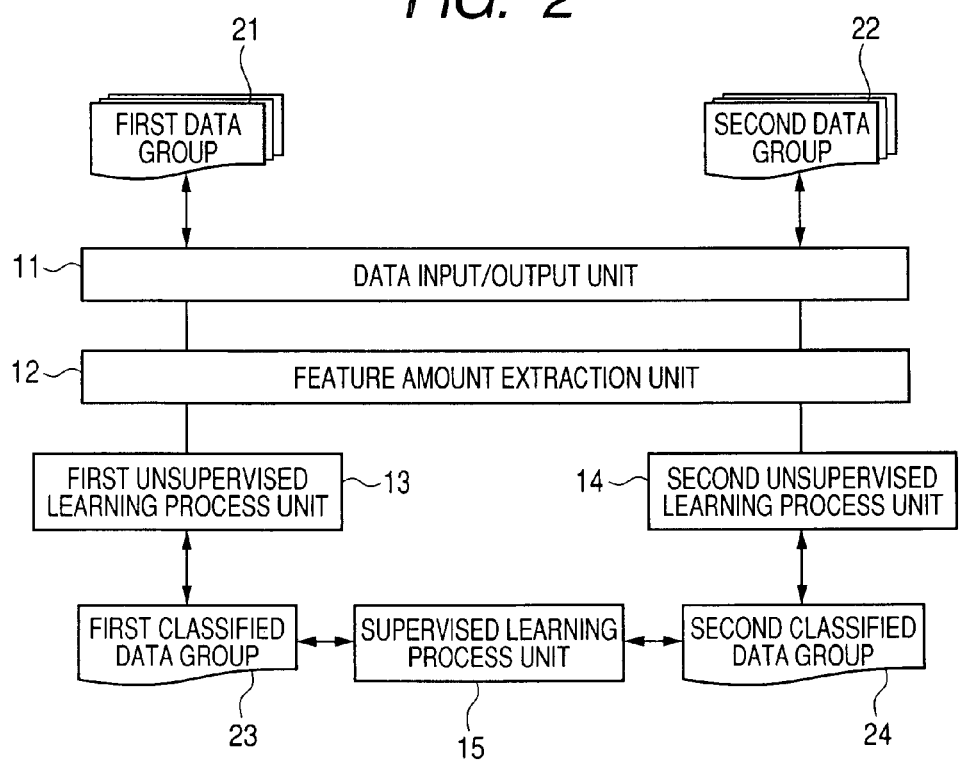
FIG. 2 is a block diagram to show a functional configuration example of the data processing apparatus according to the exemplary embodiment of the invention.

Subsequently, the functional configuration of the data processing apparatus 1 will be described. FIG. 2 is a block diagram to show a functional configuration example of the data processing apparatus 1.

The data processing apparatus 1 performs information processing using a neural network, that is, information processing having two operation modes of "learning calculation" and "output calculation." Thus, the data processing apparatus 1 has the functions of data input/output unit 11, a feature amount extraction unit 12, a first unsupervised learning process unit 13, a second unsupervised learning process unit 14, and a supervised learning process unit 15 as illustrated in FIG. 2.

The data input/output unit 11 inputs and outputs data of a first data group 21 that is a set of plural pieces of data and data of a second data group 22 that is a set of plural pieces of data. The second data group 22 is different from the first data group 21. The first data group 21 and the second data group 22 will be described later in detail. Data may be input and output using either of the communication I/F 6 or the user I/F 7. As the data input/output unit 11, one functional portion may be provided corresponding to both input and output of each of the first data group 21 and the second data group 22. However, separate functional portions may be provided corresponding to input of the first data group 21, output of the first data group 21, input of the second data group 22, and output of the second data group 22.

The feature amount extraction unit 12 extracts a feature amount from at least one of the data groups 21 and 22 input from the data input/output unit 11. Because of the expression "at least one of," the feature amount extraction unit 12 may extract feature amounts from both of the first data group 21 and the second data group 22. The feature amount and the extracting of the feature amount will be described later in detail.

The first unsupervised learning process unit 13 classifies the data of the first data group 21 input from the data input/output unit 11 according to "unsupervised learning," to perform dimension reduction for the first data group 21 and to obtain a first classified data group 23.

On the other hand, the second unsupervised learning process unit 14 classifies the data of the second data group 22 input from the data input/output unit 11 according to "unsupervised learning," to perform dimension reduction for the second data group 22 and to obtain a second classified data group 24.

That is, each of the first unsupervised learning process unit 13 and the second unsupervised learning process unit 14 forms a module corresponding to the "unsupervised learning." The "number of data dimensions," the first classified data group 23, and the second classified data group 24 will be described later in detail.

The supervised learning process unit 15 determines a mapping relation between the first classified data group 23 and the second classified data group 24 according to "supervised learning" using the first classified data group 23 and the second classified data group 24 as teacher. Also, the supervised learning process unit 15 derives, from one data, data corresponding thereto based on the mapping relation. That is, the supervised learning process unit 15 forms a module corresponding to the "supervised learning."

The units 11 to 15 forming the data processing apparatus 1 as described above are implemented by executing a predetermined program by the computer function (hardware configuration) of the data processing apparatus 1. In this case, the predetermined program may be provided as it is stored on a computer-readable storage medium or may be distributed via wired or wireless communication means before the program is installed in the data processing apparatus 1. That is, the data processing apparatus 1 of the functional configuration described above may also be implemented as a data processing program that can be installed in the data processing apparatus 1.

Next, a processing operation example of the described data processing apparatus (including the case where it is implemented as the data processing program) 1 will be described.

First, specific examples of the data groups processed by the data processing apparatus 1 will be described. FIG. 3 is a schematic representation to show specific examples of the data groups to be processed.

For example, the case where the exemplary embodiment of the invention is applied to a control system having input shown in FIG. 3A and output shown in FIG. 3B in response to the input will be described. Each of FIGS. 3A and 3B shows a data set in which values of the horizontal axis parameter (for example, time) and values of the vertical axis parameter (for example, voltage) in FIG. 3 have a predetermined relation with each other, and one parameter value changes nonlinearly in response to change in the other parameter value. The data set (=data group) shown in FIG. 3A and the data set (=data group) shown in FIG. 3B have some mapping relation with each other.

In these data groups, each of data pieces making up each data group forms one dimension. Therefore, for example, if the data group consists of 1,000 data pieces (1,000 points in the figure), the number of data dimensions of the data group is equal to 1,000.

By the way, it is assumed that if the "supervised learning" is executed using the related art and using the data groups shown in FIGS. 3A and 3B as "teacher data," the processing time for the "supervised learning" is about five hours. To improve the learning accuracy, if 50 examples of each of the data groups shown in FIGS. 3A and 3B are provided, the processing time for the "supervised learning" becomes (5×50) hours, and it cannot be said that it is practical.

Then, when the data groups shown in FIGS. 3A and 3B are input from the data input/output unit 11 as the first data group 21 and the second data group 22 in the "learning calculation" operation mode, the data processing apparatus 1 performs the following processing operation.

When the first data group 21 and the second data group 22 are input to the data processing apparatus 1, the feature amount extraction unit 12 extracts feature amounts from each of the first data group 21 and the second data group 22. This is because if the feature amounts are extracted, later data classification according to the "unsupervised learning" can be executed with the extracted feature amounts being paid attention to. However, it is noted that the extracting of the feature amounts by the feature amount extraction unit 12 is not an indispensable process. Therefore, if the first data group 21 and the second data group 22 are input, the extracting of feature amounts may be skipped or feature amounts may be extracted from either of the first data group 21 or the second data group 22.

The extracting of the feature amounts by the feature amount extraction unit 12 will be described with reference to a specific example. FIG. 4 is a schematic representation to show a specific example of the extracting of the feature amounts.

Figure 4A:
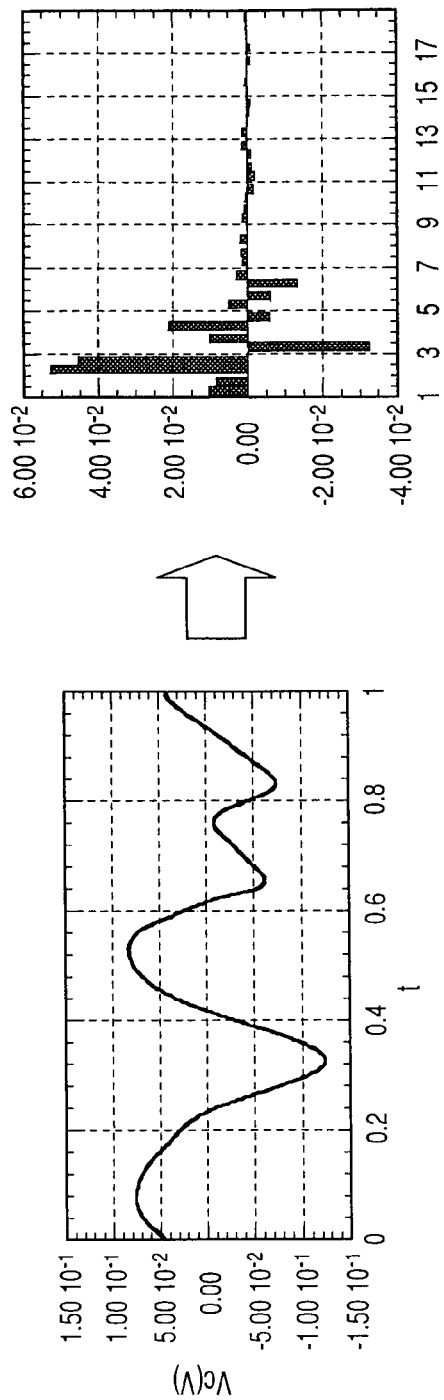
FIG. 4 is a schematic representation to show a specific example of extracting of a feature amount by the data processing apparatus according to the exemplary embodiment of the invention.

The case where the feature amount of the first data group 21 is extracted is taken as an example, The feature amount extraction unit 12 may perform FFT (fast Fourier transform) for the first data group 21 to take out only low-frequency components, use the low-frequency components for classification, and adopt the classification result as the feature amount as shown in FIG. 4A.

Figure 4B:
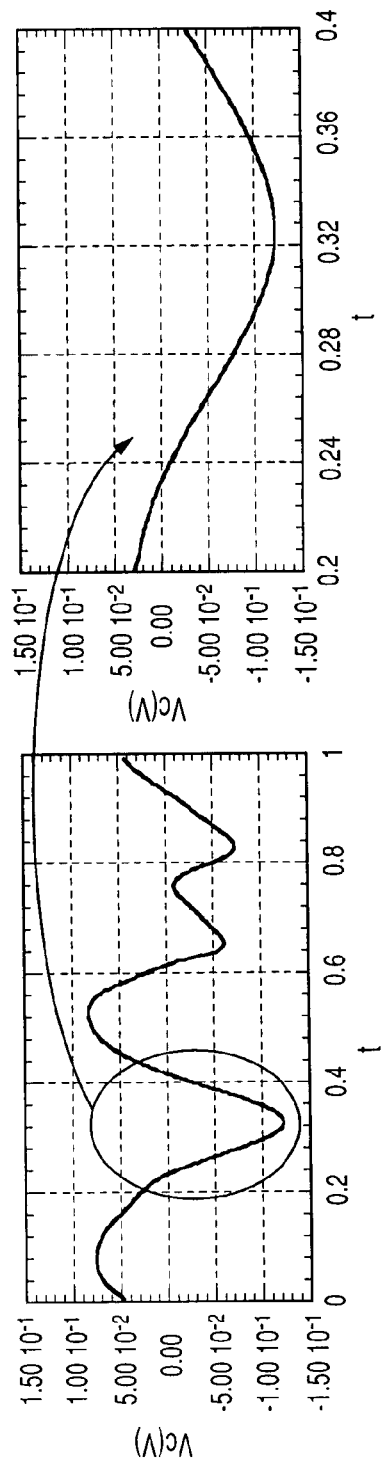

Alternatively, the feature amount extraction unit 12 may pay attention to the peak value of one curve and may adopt a portion in question as a feature amount as shown in FIG. 4B.

Thus, to extract feature amounts, the feature amount extraction unit 12 extracts feature amounts while using the known technique.

Then, in the data processing apparatus 1, the first unsupervised learning process unit 13 classifies the data of the first data group 21 (after subjected to the extracting of the feature amounts it the feature amount extraction unit 12 extracts the feature amounts) according to the "unsupervised learning." The second unsupervised learning process unit 14 classifies the data of the second data group 22 (after subjected to the extracting of the feature amounts if the feature amount extraction unit 12 extracts the feature amounts) according to the "unsupervised learning." The data classification according to the "unsupervised learning" may be executed using a known technique, for example, like classification in a self-organization map. Consequently, the first unsupervised learning process unit 13 and the second unsupervised learning process unit 14 obtain the first classified data group 23 and the second classified data group 24, respectively.

FIGS. 3C and 3D show the classification results by the first data group 21 and the second data group 22 shown in FIGS. 3A and 3B with a self-organization map, that is, specific examples of the first classified data group 23 and the second classified data group 24.

For example, the first classified data group 23 in FIG. 3C is a data group represented by a data set mapped onto a virtual XY coordinate plane and each of the data pieces making up the first data group 21 shown in FIG. 3A is mapped at any coordinate point on the XY coordinate plane. The vector similarity of a data piece at each coordinate point is represented in a visually recognizable mode according to a difference in the Euclidean norm in which if the difference is large, a dark color is used; and if the difference is small, a pale color is used, for example.

The first data group 21 and the second data group 22 are subjected to such classification with using the self-organization map, that is, the data classification according to the "unsupervised learning." Thereby, the first data group 21 and the second data group 22 are converted into the first classified data group 23 and the second classified data group 24 in which all are mapped onto the XY coordinate plane even if 50 examples of data having 1,000 data dimensions are provided, for example. That is, when the data classification according to the "unsupervised learning" is performed, the first classified data group 23 and the second classified data group 24 are obtained from the first data group 21 and the second data group 22, respectively.

Each of the first classified data group 23 and the second classified data group 24 is a data group mapped onto the XY coordinate plane. Therefore, the number of the data dimensions of each data group is equal to two (coordinate value in the X axis direction and coordinate value in the X axis direction). In other words, the first classified data group 23 and the second classified data group 24 result from reducing the numbers of the data dimensions of the first data group 21 and the second data group 22 (for example, "1,000 dimensions"×"50 examples"="50,000 dimensions") to two that is the number of the data dimensions corresponding to the mapping onto the XY coordinate plane.

Here, the case where the number of the data dimensions is reduced to two by mapping onto the XY coordinate plane is taken as an example. However, the first unsupervised learning process unit 13 and the second unsupervised learning process unit 14 may reduce the number of the data dimensions to one by mapping onto one axis or may reduce the number of the data dimensions to three by mapping onto an XYZ coordinate space. Thus, the first classified data group 23 and the second classified data group 24 result from reducing the numbers of the data dimensions regardless of the number of the original data dimensions.

The first classified data group 23 and the second classified data group 24 thus obtained have some mapping relation with each other. This is because the first classified data group 23 and the second classified data group 24 are obtained from the first data group 21 and the second data group 22 and because the first data group 21 and the second data group 22 on which the first classified data group 23 and the second classified data group 24 are based have some mapping relation with each other.

Thus, after the first classified data group 23 and the second classified data group 24 are obtained, the supervised learning process unit 15 of the data processing apparatus 1 executes the "supervised learning" using the first classified data group 23 and the second classified data group 24 as teacher and determines the mapping relation between the first classified data group 23 and the second classified data group 24. Specifically, for example, the supervised learning process unit 15 determines the mapping relation between the XY coordinates in the first classified data group 23 and the XY coordinates in the second classified data group 24. At this time, the "supervised learning" may be executed using a known technique such as a backpropagation algorithm, etc.

The processing operation is performed according to the procedure as described above, whereby the data processing apparatus 1 learns the mapping relation between the first data group 21 and the second data group 22 through the mapping relation between the first classified data group 23 and the second classified data group 24 in the "learning calculation" operation mode. The processing time for the learning, particularly, for the "supervised learning" for the first classified data group 23 and the second classified data group 24 is about 10 and several minutes. This is because the classified data groups have been obtained by reducing the number of the data dimensions according to the "unsupervised learning."

After the "learning calculation" operation mode is executed, the data processing apparatus 1 can execute the "output calculation" operation mode using the result of the "learning calculation."

The "output calculation" includes "forward problem solution" and "inverse problem solution." Here, the "output calculation" for deriving the second data group 22 from the first data group 21 is referred to as "forward problem solution" and the "output calculation" for deriving the first data group 21 from the second data group 22 is referred to as "inverse problem solution."

Figure 5A:
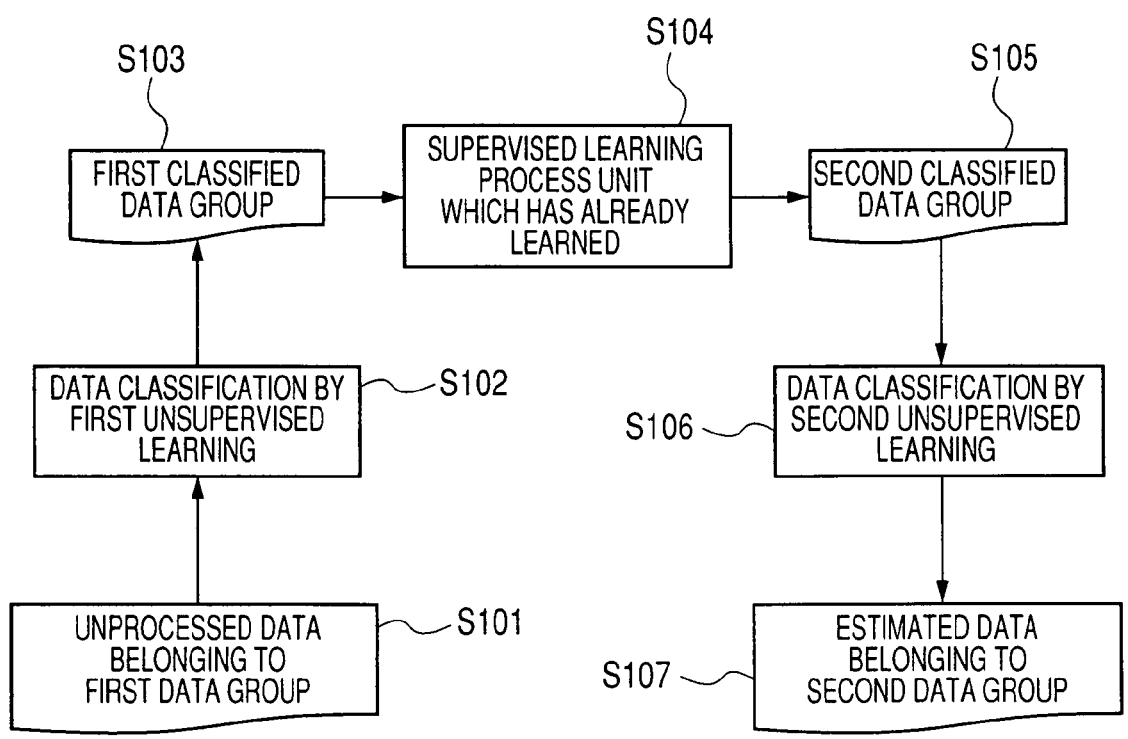
FIG. 5 is a schematic representation to show a specific example of forward problem solution by the data processing apparatus according to the exemplary embodiment of the invention.

FIG. 5 is a schematic representation to show a specific example of the forward problem solution. To execute the "forward problem solution," first, data belonging to the first data group 21 is input to the data input/output unit 11 (step 101 (S101)). Hereinafter, this data will be referred to as "unprocessed data." When the "unprocessed data" is input, the first unsupervised learning process unit 13 classifies the "% unknown data" (S102). Accordingly, coordinate points corresponding to the "unprocessed data" are determined on the XY coordinate plane of the first classified data group 23 (S103). When the coordinate points are determined, then coordinate points on the XY coordinate plane of the second classified data group 24 corresponding to that coordinate points are determined based on the mapping relation already learnt by the supervised learning process unit 15 (S104, S105). The second unsupervised learning process unit 14 performs inverse data classification for the determined coordinate points (S106). Accordingly, the data input/output unit 11 outputs data which belongs to the second data group 22 and which corresponds to the "unprocessed data" input to the data input/output unit 11 (hereinafter, this data will be referred to as "estimated data") (S107). That is, as long as the supervised learning process unit 15 has already executed the supervised learning, even if the data belonging to the second data group 22 is unknown, the unknown data can be easily derived as the "estimated data" from the "unprocessed data" belonging to the first data group 21 based on the data classification by the first unsupervised learning process unit, the mapping relation determined by the supervised learning process unit 15, and the data classification by the second unsupervised learning process unit 14.

Figure 6A:
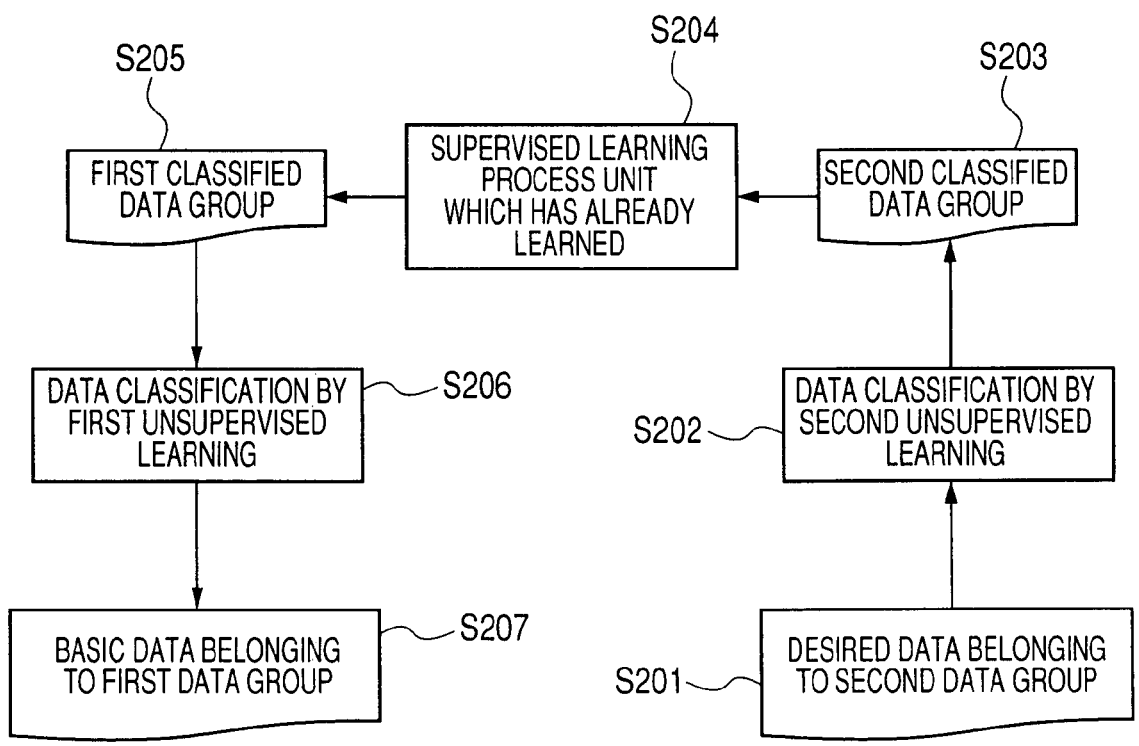
FIG. 6 is a schematic representation to show a specific example of inverse problem solution by the data processing apparatus according to the exemplary embodiment of the invention.
Figure 6B:
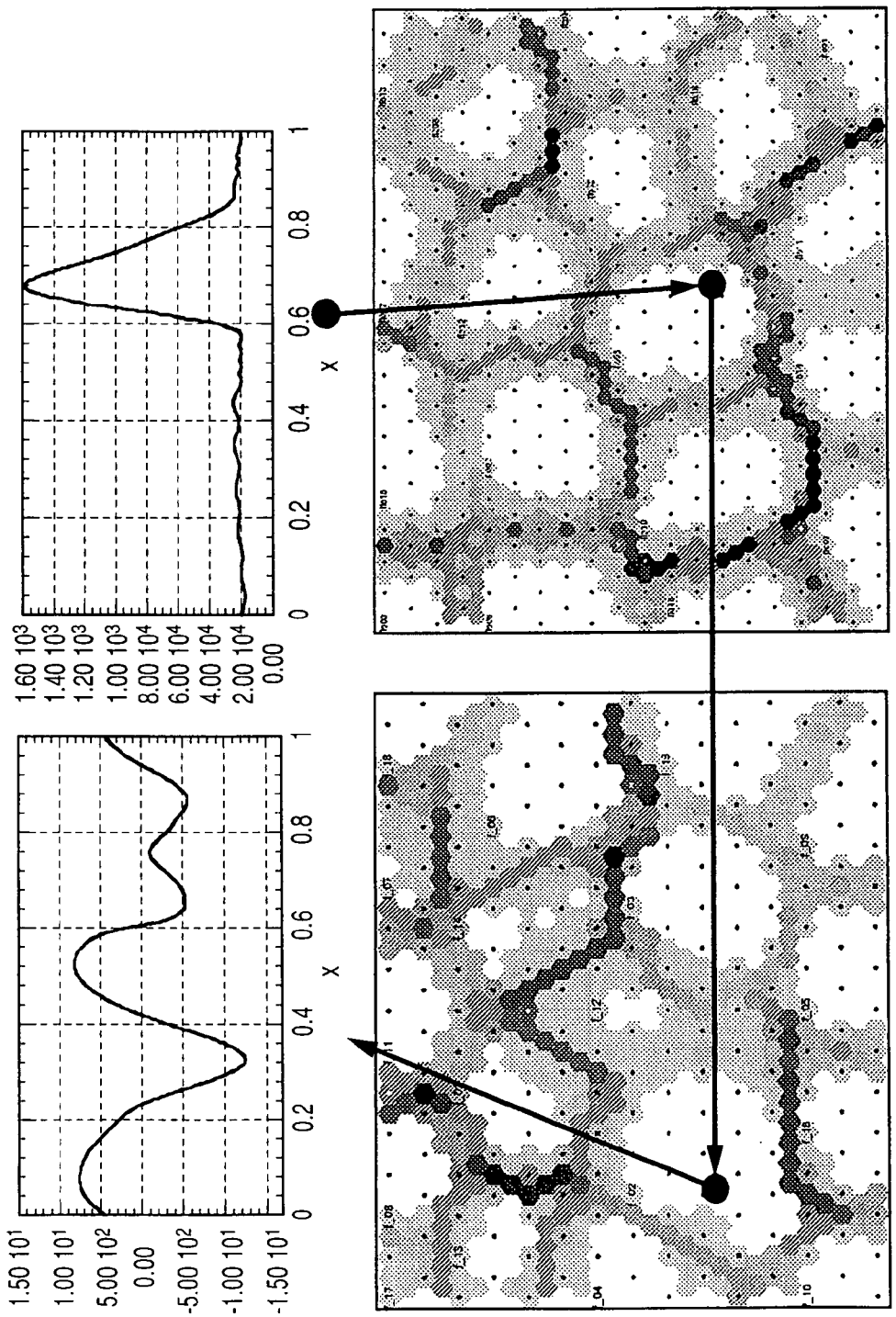

FIG. 6 is a schematic representation to show a specific example of the inverse problem solution. To execute the "inverse problem solution," first, data belonging to the second data group 22 is input to the data input/output unit 11 (S201). Hereinafter, this data will be referred to as "desired data." When the "desired data" is input, the second unsupervised learning process unit 14 classifies the "desired data" (S202). Accordingly, coordinate points corresponding to the "desired data" are determined on the XY coordinate plane of the second classified data group 24 (S203). When the coordinate points are determined, then coordinate points on the XY coordinate plane of the first classified data group 23 corresponding to those coordinate points are determined based on the mapping relation already learnt by the supervised learning process unit 15 (S204, S205). The first unsupervised learning process unit 13 performs inverse data classification for the coordinate points (S206). Accordingly, the data input/output unit 11 outputs data which belongs to the first data group 21 and which corresponds to the "desired data" input to the data input/output unit 11 (hereinafter, this data will be referred to as "basic data") (S207). That is, as long as the supervised learning process unit 15 has already executed the supervised learning, even if the data belonging to the first data group 21 is unknown, the unknown data can be easily derived as "basic data" from the "desired data" belonging to the second data group 22 based on the data classification by the first unsupervised learning process unit 13, the mapping relation determined by the supervised learning process unit 15, and the data classification by the second unsupervised learning process unit 14.

In the data processing apparatus 1 executing the "output calculation" operation mode as described above, if one of the first data group 21 and the second data group 22 corresponds to input values of a simulation process and the other corresponds to output values of the simulation process, for example, the learning result in the "learning Calculation" operation mode can be used to estimate output, corresponding to the unprocessed input, of the simulation process from the unprocessed input. The simulation process is not limited. The invention may be applied to various fields of simulation process.

If one of the first data group 21 and the second data group 22 corresponds to theoretical values and the other corresponds to actual values, for example, it is made possible to use the learning result in the "learning calculation" operation mode to derive the actual value corresponding to the theoretical values from the theoretical value and correct the theoretical value obtained in desk calculation along the actual situation according to the actual value.

Although the specific examples of the exemplary embodiments of the invention have been described, it is to be understood that the invention is not limited to the specific examples of the exemplary embodiment and various modifications and changes may be made without departing from the spirit and the scope of the invention.

For example, in the description of the exemplary embodiment, the first classified data group 23 and the second classified data group 24 are expanded on a virtual XY coordinate plane and the correspondence relation between the XY coordinates is determined according to the "supervised learning." In fact, however, the XY coordinate plane is formed in memory space of the RAM 3 or the HDD 5. Therefore, the memory addresses of the memory space rather than the XY coordinates may be associated with each other. This also applies to the case of mapping onto one axis, mapping onto the XYZ coordinate space, etc.

In the exemplary embodiment, one of the first data group 21 and the second data group 22 may correspond to the input values of the simulation process and the other may correspond to the output values of the simulation process or the one may correspond to the theoretical values and the other may correspond to the actual values. However, for example, the invention may also be applied if both of the first data group 21 and the second data group 22 correspond to actual values (raw data and raw data).

Further, in the exemplary embodiment, the case where one data processing apparatus 1 is used has been described. However, it is also possible to use two or more data processing apparatuses 1 in combination, for example. Specifically, for example, two data processing apparatuses 1 are provided and the second data group 22 processed in one data processing apparatus 1 is adopted as the first data group 21 processed by the other data processing apparatus 1 and each data processing apparatus 1 is caused to perform the processing operation sequence described in the exemplary embodiment. In this case, if it is considered that the combination of the two data processing apparatus 1 is one data processing system, the data group processed by the other data processing apparatus 1 corresponds to the second data group and the third data group from the viewpoint of the whole system. That is, n data processing apparatus 1 (n is a natural number of two or more) are provided and first to (n+1)st data groups from the viewpoint of the whole system are processed using the data processing apparatus 1. In so doing, for example, it is made possible to derive estimated data belonging to the (n+1)st data group from the unknown data belonging to the first data group 21 or perform inverse processing.

What is claimed is:

1. A data processing apparatus comprising:
   a first unsupervised learning process unit that classifies data of a first data group according to unsupervised learning, and that obtains a first classified data group based on the classified first data group by performing dimension reduction for the classified first data group;
   a second unsupervised learning process unit that classifies data of a second data group according to the unsupervised learning, and that obtains a second classified data group based on the classified second data group by performing dimension reduction for the classified second data group;
   a supervised learning process unit that performs supervised learning using, as a teacher, both the first classified data group obtained by the first unsupervised learning process unit and the second classified data group obtained by the second unsupervised learning process unit to determine a mapping relation between the first classified data group and the second classified data group; and
   wherein the first and second unsupervised learning process units are performed independently of each other.

2. The apparatus according to claim 1, further comprising:
   a first data input unit that inputs data belonging to the first data group; and
   a first data output unit that outputs data which belongs to the second data group and which corresponds to the data input to the first data input unit, wherein:
   the data output by the first data output unit is derived from the data input to the first data input unit based on the classifying by the first unsupervised learning process unit, the mapping relation determined by the supervised learning process unit, and the classifying by the second unsupervised learning process unit.

3. The data processing apparatus according to claim 1, further comprising:
   a second data input unit that inputs data belonging to the second data group; and
   a second data output unit that outputs data which belongs to the first data group and which corresponds to the data input to the second data input unit, wherein:
   the data output by the second data output unit is derived from the data input to the second data input unit based on the classifying by the first unsupervised learning process unit, the mapping relation determined by the supervised learning process unit, and the classifying by the second unsupervised learning process unit.

4. The apparatus according to claim 1, further comprising:
   a feature amount extraction unit that extracts a feature amount from at least one of the first data group and the second data group.

5. The apparatus according to claim 1, wherein:
   one of the first data group and the second data group corresponds to input values of a simulation process, and the other corresponds to output values of the simulation processing.

6. The apparatus according to claim 1, wherein:
one of the first data group and the second data group corresponds to theoretical values, and
the other corresponds to actual values.

7. A data processing method comprising:
classifying data of a first data group according to unsupervised learning;
obtaining a first classified data group based on the classified first data group by performing dimension reduction for the classified first data group;
classifying data of a second data group according to the unsupervised learning;
obtaining a second classified data group based on the classified second data group by performing dimension reduction for the classified second data group;
performing supervised learning using, as a teacher, both the first classified data group and the second classified data group to determine a mapping relation between the first classified data group and the second classified data group,
wherein the classifying data of the first data group and the classifying data of the second data group are performed independently of each other.

8. A computer readable medium storing a program causing a computer to execute data processing, the data processing comprising:
classifying data of a first data group according to unsupervised learning;
obtaining a first classified data group based on the classified first data group by performing dimension reduction for the classified first data group;
classifying data of a second data group according to the unsupervised learning;
obtaining a second classified data group based on the classified second data group by performing dimension reduction for the classified second data group;
performing supervised learning using, as a teacher, both the first classified data group and the second classified data group to determine a mapping relation between the first classified data group and the second classified data group,
wherein the classifying data of the first data group and the classifying data of the second data group are performed independently of each other.

* * * * *